Sept. 30, 1924.  J. F. CRAIG  1,509,934
MOTOR VEHICLE BRAKE
Filed Sept. 22, 1922
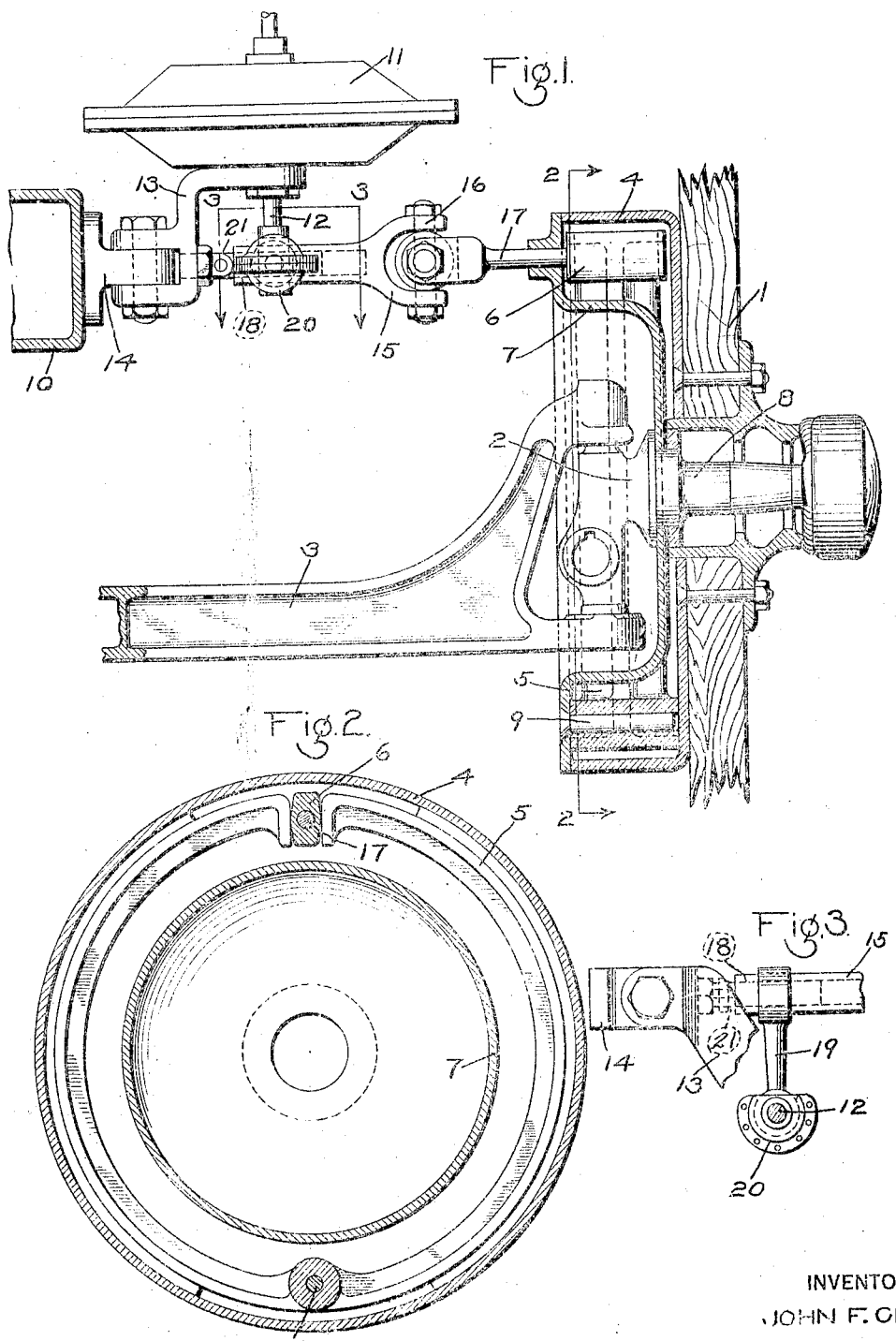
INVENTOR
JOHN F. CRAIG
BY *Wm. M. Cady*
ATTORNEY Patented Sept. 30, 1924.

1,509,934

UNITED STATES PATENT OFFICE.

JOHN F. CRAIG, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MOTOR VEHICLE BRAKE.

Application filed September 22, 1922. Serial No. 589,763.

*To all whom it may concern:*

Be it known that I, JOHN F. CRAIG, a citizen of the United States, residing at Edgewood, in the county of Allegheny and State of Pennsylvania, have invented new and useful Improvements in Motor Vehicle Brakes, of which the following is a specification.

This invention relates to fluid pressure brakes, and more particularly to a fluid pressure brake adapted for application to the front wheels of a motor vehicle.

The principal object of my invention is to provide an improved motor vehicle front wheel fluid pressure brake construction.

In the accompanying drawing; Fig. 1 is an end elevation, partly in section, of a fluid pressure brake construction embodying my invention; Fig. 2 a section on the line 2—2 of Fig. 1; and Fig. 3 a section on the line 3—3 of Fig. 1.

In Fig. 1 is shown a portion 1 of a front wheel of a motor vehicle, the wheel being mounted on a bearing carried by the usual steering knuckle 2 mounted on the front axle 3. Secured to the wheel 1 is a brake drum 4 and within the brake drum is mounted an expanding brake member 5 adapted to be expanded so as to frictionally engage the brake drum by the rotation of a cam 6. A drum cover plate 7 is secured to the bearing pin 8 of the steering knuckle and the brake member 5 is pivotally supported by the cover plate through a pin 9.

Mounted on the frame 10 of the motor vehicle is a diaphragm brake chamber 11 containing a flexible diaphragm (not shown) which is adapted to be operated by fluid under pressure for moving a stem 12. The diaphragm chamber 11 is provided with a supporting bracket 13 which is secured by means of a hinge member 14 to the frame 10, the turning axis of the hinge being preferably in the normal vertical axial plane of the wheel bearing and steering knuckle pin.

For operating the cam 6, a sleeve 15 is provided which is connected through a universal joint 16 with a stem 17 secured to the cam. Secured to the bracket 13 is a rod 18 which is mounted in and supports the sleeve 15 and said rod may be provided with a hinged joint 21 so as to permit vertical movement of the sleeve 13. An arm 19 secured to the sleeve 15 is operatively connected to the diaphragm stem 12 through a ball and socket joint 20.

When fluid under pressure is supplied to the diaphragm chamber 11, the diaphragm therein is operated to push out the stem 12 and thereby cause a rocking movement of the arm 19 and the connected sleeve 15, so that the cam 6 is rocked to effect the expansive movement of the brake member 5 and thus the brakes are applied on the front wheel of the vehicle by the frictional engagement of the stationary brake member 5 with the rotating drum 4.

The universal joint, sleeve and sliding pin connection, and the hinge support co-operate to permit relative movement of the brake drum when the front wheel is turned in steering the vehicle, and it will be evident that the brakes may be applied and released in any position of the vehicle wheel.

Having now described my invention, what I claim as new and desire to secure by Letters Patent, is:—

1. In a motor vehicle, the combination with a vehicle frame and a fluid pressure brake chamber mounted on said frame, of a vehicle front wheel, a rotating brake member carried by said wheel, a stationary brake member for engaging the rotating brake member, an operating connection between said brake chamber and said stationary brake member, and a universal joint in said operating connection.

2. In a motor vehicle, the combination with a vehicle frame, a front vehicle wheel, a brake member rotating with the wheel, and a stationary brake member for engaging said rotating brake member, of a fluid pressure brake chamber mounted on said frame, an operating connection between said brake chamber and said stationary brake member, and a sliding joint in said operating connection.

In testimony whereof I have hereunto set my hand.

JOHN F. CRAIG.